United States Patent
Pattabiraman et al.

(10) Patent No.: US 6,856,789 B2
(45) Date of Patent: Feb. 15, 2005

(54) SYSTEM AND METHOD FOR BLUETOOTH PAGING WITH TRANSMIT POWER REDUCED ACCORDING TO CHANNEL METRICS MEASURED DURING INQUIRY PROCESS

(75) Inventors: Ganesh Pattabiraman, Stanford, CA (US); Wayne A. Lee, Los Altos, CA (US); Thomas E. Wendoll, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 522 days.

(21) Appl. No.: 10/115,209

(22) Filed: Apr. 2, 2002

(65) Prior Publication Data

US 2004/0203362 A1 Oct. 14, 2004

(51) Int. Cl.[7] ............................ H04B 7/00; H04B 17/00
(52) U.S. Cl. ...................... 455/41.2; 455/69; 455/67.11
(58) Field of Search ........................ 455/41.2, 69, 67.11, 455/522, 515, 434, 458, 127.5; 370/344, 465

(56) References Cited

U.S. PATENT DOCUMENTS

2003/0012173 A1 * 1/2003 Rune .......................... 370/344

* cited by examiner

Primary Examiner—Lee Nguyen
Assistant Examiner—Raymond B. Persino
(74) Attorney, Agent, or Firm—Philip Wadsworth; Charles Brown; Richard Bachand (57) ABSTRACT

Power levels for transmitting Bluetooth paging signals are optimized by applying mapping rules dictating different power levels for different signal quality characteristics measured during an earlier, pre-paging inquiry process. A subject Bluetooth device initially receives responses to universally addressed, blind inquiry signals previously broadcast by the subject Bluetooth device. In response, the subject Bluetooth device measures signal quality characteristics of each device's response. When a Bluetooth device to be paged is identified, the subject Bluetooth device applies the mapping rules to the measured signal quality characteristics for the identified device to select an appropriate power level for use in paging that Bluetooth device.

35 Claims, 3 Drawing Sheets

SYSTEM AND METHOD FOR BLUETOOTH PAGING WITH TRANSMIT POWER REDUCED ACCORDING TO CHANNEL METRICS MEASURED DURING INQUIRY PROCESS

BACKGROUND

1. Field

The present invention concerns Bluetooth communications, and more particularly, a method and system for one Bluetooth device to conserve power during paging of other Bluetooth devices, and also to minimize the interference that such paging presents in the applicable frequency band. This is achieved by using transmit power that has been reduced in accordance with channel metrics measured during an earlier inquiry process.

2. Background

"Bluetooth" is a wireless personal area network technology supporting wireless voice and data communication between different nearby devices. A number of different devices can be Bluetooth-enabled, for example, cell phones, personal digital assistants, or laptop computers. Each such device is equipped with a receiver, transmitter, and other Bluetooth components, allowing it to communicate with other similarly equipped, nearby devices without the use of cables or other physical connections.

Operation of Bluetooth-enabled devices ("Bluetooth devices") includes various operating processes and modes, as prescribed by the applicable Bluetooth specifications and standards. Briefly, in an "inquiry" process, a Bluetooth device sends a number of universally broadcast inquiry messages, called "inquiry IDs." The inquiry process, performed to discover the presence of other "remote" Bluetooth devices within range, is an essential precursor to establishing a connection with one or more of these devices. As an example, a Bluetooth device may perform its inquiry process whenever a need (such as an operator request) arises to establish communications with a remote Bluetooth device.

After completing the inquiry process, a Bluetooth device proceeds to page one or more remote Bluetooth devices. For each device, paging is conducted for a prescribed time, such as 10.24 seconds. If the remote device answers the page during the prescribed time, the two devices cooperatively establish a connection during which data is exchanged, such as user, customer, subscriber, or other such data. Active mode communications involve the exchange of messages related to customer or subscriber data, in contrast with metadata and network data exchanged during idle or standby mode communications and not associated with customer/subscriber data.

In addition to the inquiry process, page process, and connection processes, Bluetooth devices perform a variety of other operating modes and processes as well. All communications are conducted in the unlicensed 2.4 GHz ISM ("Industrial, Scientific and Medical") band, which spans a frequency range of 2400.0 to 2483.5 MHz in the United States and Europe. The ISM band is further divided into 80 RF channels or frequency bins, which are each 1.0 MHz wide.

In addition to Bluetooth devices, the ISM band is also occupied by systems that operate under the IEEE 802.11b specification for wireless local area networks ("IEEE 802.11b wireless systems"). Other devices such as microwave ovens also operate in the same ISM band. IEEE 802.11b wireless systems and microwave ovens operate in the ISM band at much greater transmit power than Bluetooth devices. Thus, due to the overlapping frequency bands and greater signal strength utilized by some non-Bluetooth devices, there is a possibility of such devices interfering with Bluetooth communications.

Signal interference, then, can be a problem during the Bluetooth inquiry process, during the page process, during established connections, and during all other operating modes. Conventional Bluetooth devices try to defeat signal interference in different ways during the different processes. In the page process, for example, known Bluetooth devices transmit their page signals at full transmit power regardless of the presence or absence of signal interference. The advantages of this approach are that it is uncomplicated and that it is likely to overcome any signal interference that might be present.

One unforeseen disadvantage of this approach, as discovered by the present inventors, is that when signal interference is low, the act of paging with full transmit power is unnecessary. Therefore, as further recognized by the present inventors, Bluetooth devices may utilize more power than necessary during page mode operations. And, since many Bluetooth devices operate on battery power, greater power consumption is undesirable because it drains the battery more quickly. Ultimately, the battery must be recharged, or if a recharging source is unavailable, the battery will cease to operate.

In addition to excessive power consumption, another disadvantage of conventional page mode operations, as recognized by the present inventors, is that use of full transmit power may increase the possibility of Bluetooth devices unnecessarily interfering with other Bluetooth and/or IEEE 802.11b wireless systems operating in the same area. For instance, paging with high transmit power may create signal interference for Bluetooth devices that are not being paged.

Although the construction and use of Bluetooth devices generally constitute significant advances, then, the present inventors have nonetheless discovered unforeseen problems with conventional Bluetooth devices.

SUMMARY

Broadly, one aspect of this invention optimizes power levels for transmitting Bluetooth paging signals by applying mapping rules that dictate different power levels for different specified conditions, such as signal quality characteristics measured during an inquiry process prior to paging. In addition to conserving power, this minimizes the signal interference experienced by other devices operating in the same frequency band.

More particularly, a subject Bluetooth device initially receives responses to universally addressed, blind inquiry signals previously broadcast by the subject Bluetooth device. In response, the subject Bluetooth device measures signal quality characteristics of each remote device's response. Then, when the subject Bluetooth device receives identification of one or more Bluetooth devices to be paged, it performs various operations for each identified Bluetooth device. Namely, the subject Bluetooth device applies the mapping rules to conditions including at least the measured signal quality characteristics for the identified device to select a power level for use in paging the identified Bluetooth device.

The present invention provides a number of distinct advantages. Chiefly, power is conserved by conducting Bluetooth paging with the least possible transmit power appropriate to detected channel conditions. Ultimately, this conserves battery power and helps delay inconvenient battery recharging, or worse, battery exhaustion. In addition, paging in this manner minimizes the amount of signal interference presented to devices to which the paging signals are not directed. The invention also provides a number of other advantages and benefits, which should be apparent from the following description of the invention.

DETAILED DESCRIPTION

Introduction

The nature, objectives, and advantages of the invention will become more apparent to those skilled in the art after considering the following detailed description in connection with the accompanying drawings.

Although the invention is described with respect to specific embodiments, the principles of the invention as defined by the claims appended herein may be applied beyond the embodiments of the description described specifically herein. Moreover, certain details have been omitted to avoid obscuring the inventive aspects of the invention. The specific details not described in the present application are within the knowledge of a person of ordinary skill in the art, having the benefit of this disclosure.

The drawings in the present application and their accompanying detailed description are directed to examples of different embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Hardware Components & Interconnections

Figure 1:
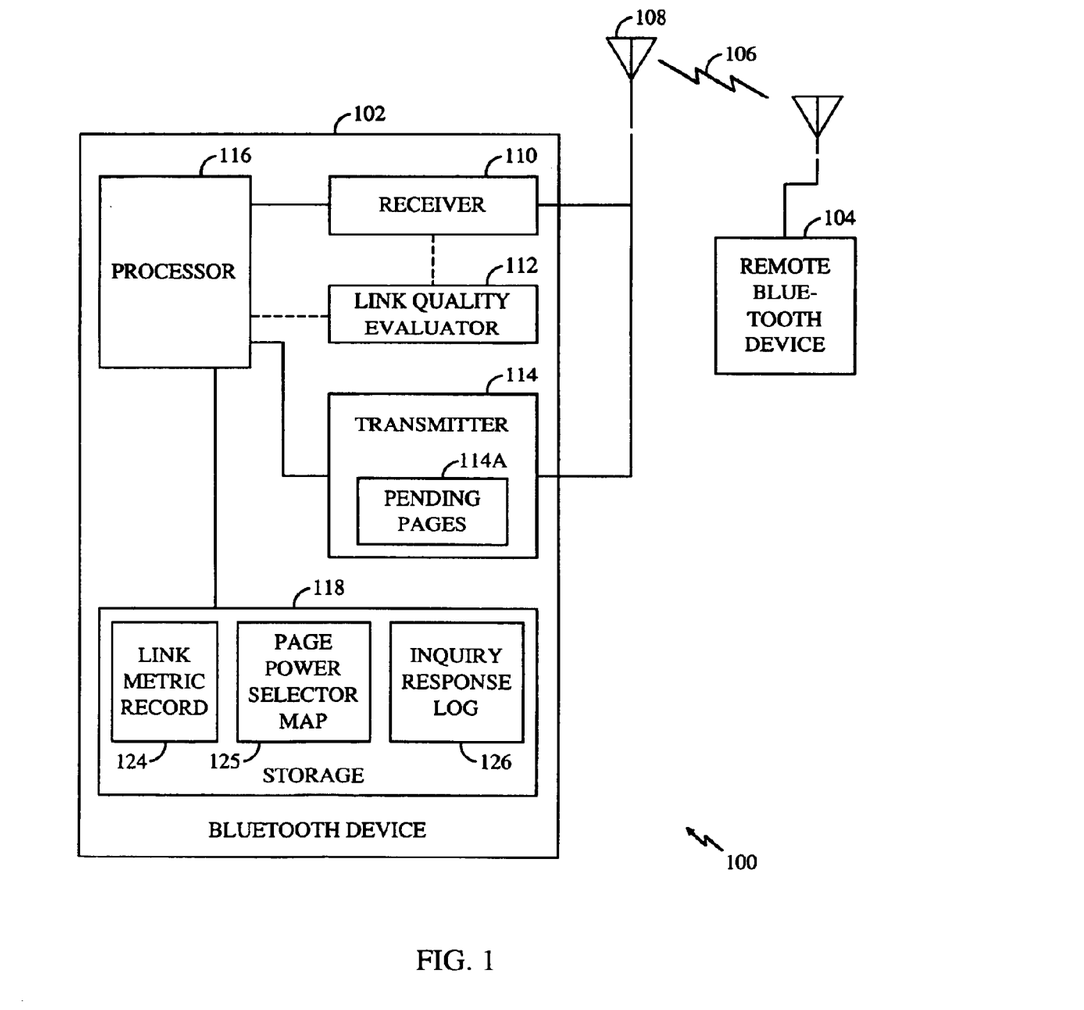
FIG. 1 is a block diagram of an exemplary Bluetooth system in accordance with one embodiment of the invention.

FIG. 1 illustrates an exemplary Bluetooth system 100 according to one embodiment of the invention. As one example, the system 100 may comprise part of a code division multiple access ("CDMA") communication system configured to be interoperable with Bluetooth technology. The general principles of CDMA communication systems, and in particular the general principles for generation of spread spectrum signals for transmission over a communication channel are described in various well known patents and publications.

The system 100 includes first and second Bluetooth devices 102, 104. Some examples of the Bluetooth devices 102, 104 include, for example, Bluetooth-enabled CDMA cell phones, cordless phone base stations, laptop computers, etc. For purposes of illustration, the device 102 is referred to as the "remote device." In implementation, each of the devices 102, 104 may be in communication with one or more additional devices (not shown), as permitted by the Bluetooth protocol.

In the illustrated example, the system 100 utilizes the Bluetooth wireless networking protocol, as described in Bluetooth Specification v1.1, published by the Bluetooth Special Interest Group. Here, Bluetooth device 102 is configured to communicate with remote device 104 in the 2.4 GHz ISM band utilizing frequency hop spread spectrum ("FHSS") technology. Bluetooth device 102 communicates with remote device 104 via Bluetooth wireless link 106 utilizing antenna 108. Utilizing FHSS technology, Bluetooth devices 102, 104 receive and transmit in 80 different 1.0 MHz-wide frequency channels, also referred to as "frequency bins" in the present application.

Continuing with FIG. 1, Bluetooth device 102 includes a processor 116, receiver 110, link quality evaluator 112, transmitter 114, storage 118, and antenna 108. The storage 118 includes a link metric record 124, page power selector map 125, and inquiry response log 126.

The receiver 110 comprises, as an example, a Bluetooth-compatible demodulator. Likewise, the transmitter 114 may comprise a modulator, compatible with the Bluetooth protocol. Receiver 110 is configured to receive Bluetooth voice and/or data packets from remote device 104 over Bluetooth wireless link 106 via antenna 108. Unintentionally, receiver 110 may also receive signal interference including signals from non-Bluetooth devices such as microwave ovens and IEEE 802.11b wireless systems, for example.

The transmitter 114 is configured to transmit Bluetooth messages, inquiry signals called "inquiry IDs," pages, and other signals to devices such as the remote device 104, using the antenna 108 and wireless link 106. To illustrate the aspect of paging, the transmitter 114 is illustrated with pages 114a pending transmission to various remote devices. In other words, the contents of 114a identify one or more remote Bluetooth devices (such as 104) to be paged by the device 102. The structure 114a may be implemented in a buffer, register, or other storage. Alternatively, the pending pages 114a may be maintained within the processor 116, storage 118, or any other suitable site, the illustrated location 114a being shown as one example. In one example, the pending pages 114a may be established after completion of an inquiry process to determine which other Bluetooth devices are within range, and therefore amenable to paging.

The link quality evaluator 112 comprises circuitry to evaluate the quality of signals received by 110. In the illustrated example, the evaluator 112 measures quality of signals arriving in any of the 80 frequency bins in the 2.4 GHz ISM band. In the illustrated embodiment, the evaluator 112 serves to evaluate signal quality of responses that remote Bluetooth devices return to the device 102's inquiry signals. The evaluator 112 may also evaluate remote Bluetooth devices' responses to paging signals, namely, failure to respond dictating the need to increase the transmitter 114's paging transmit power (as discussed below). Depending upon the implementation, the evaluator 112 may evaluate any suitable aspect of such Bluetooth inquiry response signals, such as measured signal energy (total strength of received signals), packet header failure, packet header correction value, or another signal characteristic by which the quality of an inquiry response signal from a remote Bluetooth device may be evaluated. One particular gauge of measured energy is the received signal strength indicator (RSSI). Depending upon the nature of the signal evaluation being implemented, the evaluator 112 may be coupled to the receiver 110, processor 116, or both.

In the illustrated example, the storage 118 comprises circuit memory such as random access memory (RAM). However, the storage 118 may be implemented by a hard disk drive, flash memory, or any other volatile or nonvolatile storage. The storage 118 is coupled to processor 116, enabling the processor 116 to read/write information from/to the storage 118. The storage 118 includes a link metric record 124, page power selector map 125, and inquiry response log 126.

The record 124 is used to store information produced by the evaluator 112, and more particularly, measurements of the signal quality of each remote Bluetooth device's response to an inquiry signal from the device 102. In one specific implementation, the record 124 comprises a table as shown below in TABLE 1. In the illustrated table, each row corresponds to a different remote Bluetooth device (such as 104) that has responded to an inquiry signal of the device 102, as explained in greater detail below. For each responding device, the record 124 lists the evaluator 112's measurement of signal quality of the device's inquiry response, referred to as "link metric." In TABLE 1, the remote devices are identified by identification code (e.g., device AA), but may alternatively be identified by any serial number, PIN, device name, or any other useful numeric, alphabetic, alphanumeric, or other code. In the particular example of TABLE 1, signal quality (link metric) is expressed in terms of RSSI, measured in dBm.

In the example of TABLE 1, then, the inquiry signal returned by device AA demonstrated a signal strength of 0 RSSI, whereas the inquiry signals by devices AB and AC demonstrated respective signal strengths of −20 and −2 RSSI.

TABLE 1

EXEMPLARY LINK METRIC RECORD 124

| col. 1 ROW | col. 2 REMOTE DEVICE | col. 3 LINK METRIC (RSSI, in dBm) |
|---|---|---|
| 1 | device AA | 0 |
| 2 | device AB | −20 |
| 3 | device AC | −2 |
| ... | ... | ... |

The storage 118 further includes a page power selector map 125. The map 125 contains instructions, data, logic, artificial intelligence, or other data or decision-making capability to determine which transmit level is appropriate to transmit pending pages. The map 125 is specifically applied to the pages 114a as discussed below. The map 125's selection of transmit power is based upon the signal quality level measured for the particular remote device to be paged. Accordingly, the map 125 correlates different signal quality levels with the appropriate paging transmit power to be used when a device exhibits that signal quality level. The map 125, also referred to as "mapping rules," may be implemented by a lookup table, relational or non-relational database, logic circuitry, instruction processing machine, artificial intelligence, or other appropriate decision maker. TABLE 2, below, gives one example of some exemplary entries in a packet/power selector map 125, implemented as a lookup table.

TABLE 2

EXEMPLARY MAP 125

| ROW | LINK METRIC (RSSI, in dBm) | APPROPRIATE TRANSMIT POWER LEVEL (dBm) |
|---|---|---|
| 1 | −3 | −20 |
| 2 | −5 | −20 |
| 3 | −10 | −20 |
| 4 | −15 | −12 |
| 5 | −30 | −10 |
| 6 | −45 | −7 |
| 7 | −55 | −5 |
| 8 | −60 | 0 |
| 9 | −65 | 0 |
| 10 | −70 | 0 |
| 11 | ... | ... |

TABLE 2 is configured to determine the optimal transmit power for each different link metric, i.e., signal quality. The "optimal" transmit power is that which requires the minimum amount of power to establish a reliable connection, and considers for example, an expected average distance of nearby Bluetooth device, transmissivity of air media, transmitter losses, and the like. The map 125, for example, may even be particular to the make and model of transmitter 114 being used. Broadly, for higher levels of signal quality (indicating better channel conditions), TABLE 2 specifies lower levels of transmit power needed to succeed in this environment. Conversely, for lower signal quality levels (indicating worse channel conditions), then TABLE 2 specifies higher levels of transmit power to succeed in this environment. In TABLE 2, the transmitter 114's maximum transmit power is 0 dBm, and its minimum transmit power is −20 dBm.

As mentioned above, the storage 118 further includes the inquiry response log 126. In contrast to the link metric record 124, which stores measurements of signal quality, the inquiry response log 126 stores the contents of remote Bluetooth devices' responses to inquiry IDs sent by the transmitter 112 during the inquiry process. For each inquiry response, the log 126 may include (for example) the identity of the responding Bluetooth device, the frequency bin where the response occurred, features that the remote device supports, and some or all other information contained in the inquiry response message. The log 126 may comprise a linked list, table, database, ASCII text file, or any other data structure suitable to store data as previously described.

The processor 116 comprises a digital signal processing apparatus that oversees operations of the device 102. The processor 116 may be implemented by various hardware devices and components, as discussed in greater detail below. For instance, one component of the processor may be a frequency hopping spread spectrum (FHSS) module (not shown). The FHSS module comprises a software program, subroutine, data object, hardware device or subcomponent, circuit, or other module that utilizes FHSS technology to select frequency bins to be used to transmit signals to remote devices. Alternatively, the FHSS module may be partially or completely implemented in another processing entity apart from the processor 116.

Exemplary Digital Data Processing Apparatus

As mentioned above, data processing entities such as the device 102, device 104, processor 116, map 125, and the like may be implemented in various forms. One example is a digital data processing apparatus, as exemplified by the hardware components and interconnections of the digital data processing apparatus 200 of FIG. 2.

Figure 2:
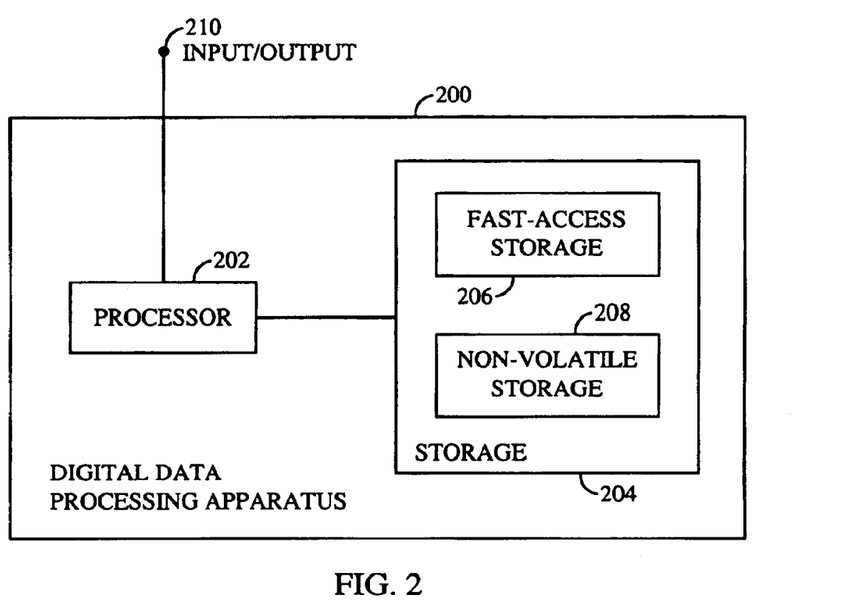
FIG. 2 is a block diagram of an exemplary digital data processing machine.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement data processing entities of the system 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operational Sequences—Introduction

Having described the structural features of the present invention, the operational aspect of the present invention will now be described. As mentioned above, the operational aspect of the invention generally involves operating a Bluetooth device to transmit paging signals at the lowest possible transmit power levels, in order to conserve power and avoiding creating interference for other devices operating in the same frequency band, such as IEE 802.11b wireless systems and Bluetooth devices that are not being paged.

Figure 3:
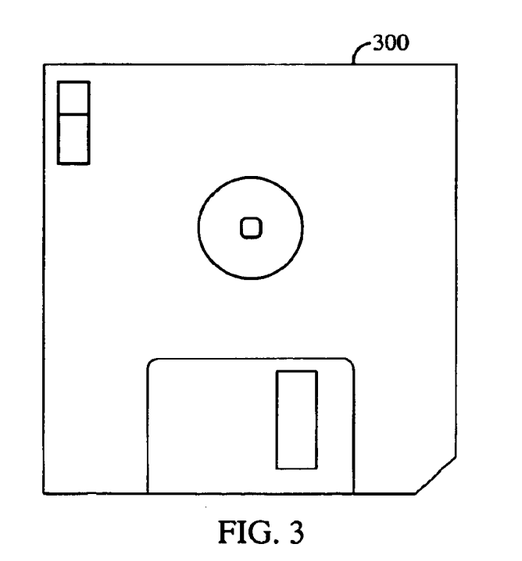
FIG. 3 is a diagram of an exemplary signal bearing medium.

Wherever the functionality of the invention is implemented using one or more machine-executed program sequences, these sequences may be embodied in various forms of signal-bearing media. In the context of FIG. 2, for example, such a signal-bearing media may comprise, for example, the storage 204 or another signal-bearing media, such as a magnetic data storage diskette 300 (FIG. 3), directly or indirectly accessible by a processor 202. Whether contained in the storage 204, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Operational Sequence

Figure 4:
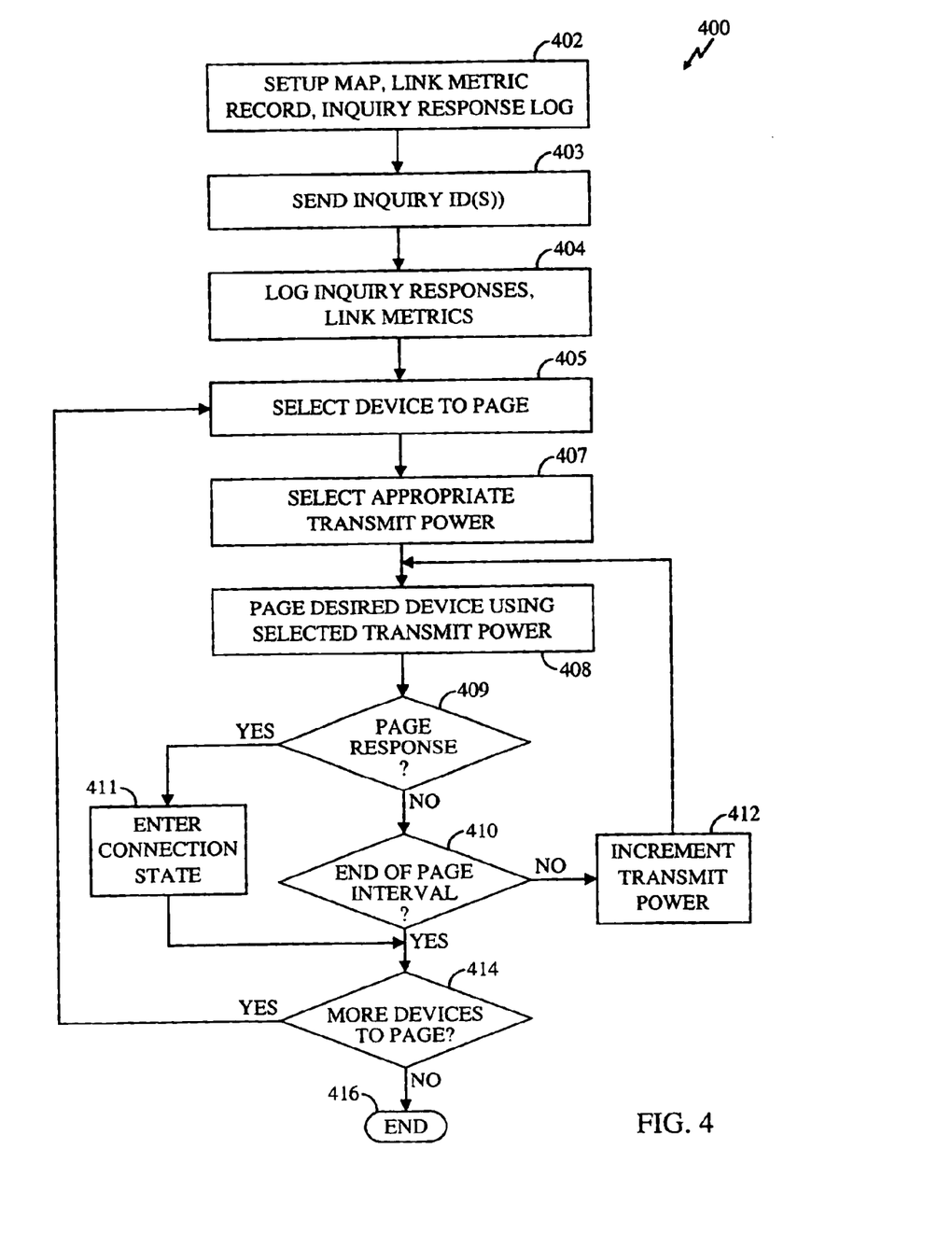
FIG. 4 is a flowchart of a process for optimizing Bluetooth page operations based upon measurements of signal quality made during a prior inquiry process.

Referring FIG. 4, the sequence 400 describes an exemplary process for optimizing Bluetooth paging operations, which includes updating the link metric record 124 and inquiry response log 126 and applying the map 125. For illustrative purposes, without any intended limitation, the sequence 400 is described in the context of the Bluetooth device 102 in its communication with the remote device 104 (FIG. 1).

In step 402, the map 125 is established. This step may be performed in different ways, depending upon the structure of the map 125. For instance, step 402 may involve programmers, engineers, technicians, or other designers constructing a lookup table, configuring logic circuitry, training an artificial intelligence unit, or otherwise configuring the map 125. In this step, the map 125 is configured to choose the optimal power level, namely, the minimum power level required to establish a reliable connection to transmit pending pages. The map 125 provides mapping rules correlating different levels of transmit power to be used for transmission of paging signals under various conditions including, at minimum, signal quality characteristics measured for different remote devices. Creation of the map 125 in step 402 may be consummated by an appropriate manufacturing operation, such as programming of appropriate circuit memory and machine/hand assembly of the pertinent Bluetooth device.

Also in step 402, the processor 116 initializes the link metric record 124 and inquiry response log 126. In each case, the processor 116 may, for instance, open a blank table, clear a previously established table, create a data structure, or otherwise initialize a data object appropriate to the record 124. This may be performed at manufacturing or a later step such as configuration, boot-up, software initialization or installation, etc.

In step 403, the processor 116 begins the inquiry process. Here, the processor 116 directs the transmitter 114 to transmit one or more inquiry IDs, also called "inquiry signals." The inquiry IDs are universally broadcast, that is, not addressed to specific Bluetooth devices. The inquiry IDs may be broadcast to all devices operating under the Bluetooth specification, or any definable subset of Bluetooth devices. The inquiry IDs are broadcast in the "blind," since there is no foreknowledge that any other Bluetooth devices are nearby at the time of inquiry. By soliciting "inquiry responses," the inquiry IDs seek return information from all other Bluetooth devices that are within range.

Inquiry responses, if any, are received in step 404. During step 404, the processor 116 updates the inquiry response log 126 with the applicable information about any inquiry responses that were received in step 403. When receiving an inquiry response from a remote device that already has an entry in the log 126, the processor 116 replaces the log 126's data for that device with the newly received information.

Also in step 404, the processor 116 measures the quality of each received inquiry response signal. As mentioned above, the evaluator 112 may gauge signal quality based on various characteristics, with the illustrated example being measured energy, expressed as RSSI. The evaluator 112 operates using information from the receiver 110 and/or the processor 116, depending upon the nature of the signal evaluation. For instance, signal strength may be determined based on information from the receiver 110, whereas packet header failure information is available from the processor 116. For each remote device that submits an inquiry response, the processor 116 stores its signal quality measurement in the link metric record 124 in association with that particular device.

When receiving an inquiry response from a remote device that already has an entry in the link metric record 124, the processor 116 may replace the link metric record's old signal quality measurement with new, or optionally incorporate the new data into the existing link metric data by averaging or another suitable technique of combination.

Step 405 begins the paging process. Here, the processor 116 and/or transmitter 114 selects a remote Bluetooth devices to page by checking the pending page queue 114a. The number and identity of Bluetooth devices to be paged, represented in the queue 114a, originates from the processor 116 based upon whether there are any upcoming tasks of the device 102 for which communication with a particular Bluetooth device is necessary or advantageous. The process of determining which remote Bluetooth devices to page may be conducted according to strategies which are already known to those of ordinary skill in the applicable art. If the queue 114a contains multiple devices to page, the processor 116 identifies the next device to be paged 114a in any suitable manner, such as based on the first device to respond to the inquiry ID, the responding device with the strongest inquiry response, randomly, etc.

In step 407, the processor chooses a transmit power level to be used in paging the device identified in step 405. More particularly, the processor 116 applies the map 125 to the measured signal quality of the inquiry response from the particular device to be paged. This produces a prescribed transmit power level. The signal quality measurement is obtained from the record 124, as prepared earlier in step 404.

Next after step 407, the processor 116 in step 408 directs the transmitter 114 to page the device that was identified in step 405, using the transmit power level chosen in step 407 (step 408). Following step 408, the processor 116 polls the receiver 110 to determine whether any response to the page is received (step 409). If so, the processor 116 proceeds to establish a connection with the responding device (step 411). Optionally, the connection of step 411 may be established using the same transmit power level that was selected in step 407 or step 412 (discussed below), as applicable. After step 411, the processor 116 advances to step 414 to determine whether there are remaining devices left in the pending page queue 114a. If the queue 114a contains more devices to page, the routine 400 returns to step 405 to select another remote Bluetooth device to page.

In contrast to the foregoing description, if step 409 does not receive a response to the page sent in step 408, the processor 116 in step 410 asks whether an allotted page interval has elapsed. If so, the device 102 has failed to page the current remote device, and control advances to step 414, the details of which were discussed above. In contrast, if the allotted page interval has not elapsed, the processor 116 in step 412 increases the paging transmit power 412. For instance, each time step 412 is performed, the processor 116 may increase power by a fixed amount, an exponentially increasing amount, or by another amount dictated by any prescribed pattern for systematically increasing transmit power. After step 412, the program 400 returns to step 408 to page the same device again, using the increased power. After step 408, the routine continues in the manner explained above until the page ultimately succeeds ("yes" answer to step 409) or fails ("yes" answer to step 410).

Ultimately, when step 414 finds that there are not any remaining devices to page, the program 400 ends in step 416.

Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terns of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

What is claimed is:

1. A method of optimizing transmit power levels for Bluetooth paging signals by applying rules dictating different power levels for Bluetooth paging under various specified conditions including signal quality characteristics, the operations comprising:

responsive to a subject Bluetooth device receiving one or more remote Bluetooth devices' inquiry responses to universally addressed inquiry signals previously broadcast by the subject Bluetooth device, the subject Bluetooth device measuring prescribed signal quality characteristics of such inquiry responses;

the subject Bluetooth device receiving identification of one or more remote Bluetooth devices to be paged, and for each identified device, the subject Bluetooth device selecting a transmit power level for use in paging the identified device by performing operations comprising applying the rules to conditions including at least the measured signal quality characteristics of one or more inquiry responses received from the identified device.

2. The method of claim 1, the operations further comprising:

establishing the rules.

3. The method of claim 1, the operations further comprising:

operating the subject Bluetooth device to broadcast the universally addressed inquiry signals.

4. The method of claim 1, the operations further comprising:

for each identified device, the subject Bluetooth device paging the identified device using the selected transmit power level.

5. The method of claim 1, the operations further comprising:

for each identified device, the subject Bluetooth device paging the identified device using the selected transmit power level;

responsive to receiving a response from an identified device, the subject Bluetooth device establishing a connection with the responding device utilizing the selected transmit power level.

6. The method of claim 1, the operations further comprising, for each identified device:

the subject Bluetooth device paging said identified device using the selected transmit power level;

repeatedly paging the identified device with increasing transmit power levels responsive to failures of the subject Bluetooth device to receive signals from the identified device confirming receipt of the pages.

7. The method of claim 1, where the operation of measuring prescribed signal quality characteristics comprises quantifying at least one of the following:

strength of received signals;

packet header failure;

packet header correction value.

8. The method of claim 1, the operation of applying the rules comprises:

applying the rules to conditions including at least a combined representation of previously measured signal quality characteristics of inquiry responses received from the identified device.

9. The method of claim 1, the operations further comprising:

responsive to receipt of a current inquiry response from a remote Bluetooth device for which a link metric record does not contain any measurements of signal quality characteristics of previous inquiry responses, storing the measurement of signal quality characteristics for the current inquiry response in the link metric record;

responsive to receipt of a current inquiry response from a remote Bluetooth device for which the link metric record already contains at least one existing measurement of signal quality characteristics of previous inquiry responses, updating the existing measurement to incorporate the measurement of signal quality characteristics for the current inquiry response;

where the operation of applying the rules comprises applying the rules to the measured signal quality characteristics contained in the link metric record.

10. A method for optimizing power levels used to transmit Bluetooth paging signals, comprising operations of:

establishing mapping rules associating different Bluetooth paging transmit power levels with various specified conditions including signal quality characteristics;

operating a subject Bluetooth device to transmit at least one inquiry signal universally addressed to other Bluetooth devices;

the subject Bluetooth device receiving one or more inquiry responses to the inquiry signal and measuring signal quality characteristics of the inquiry responses;

the subject Bluetooth device receiving identification of one or more Bluetooth devices to be paged;

for each identified device, the subject Bluetooth device selecting a power level for use in paging the identified device by performing operations comprising applying the mapping rules to conditions including at least the measured signal quality characteristics of one or more inquiry responses received from the identified device.

11. A method of optimizing transmit power levels for Bluetooth paging signals by applying a mapping supplying different power levels for Bluetooth paging under various corresponding conditions including signal quality characteristics, comprising operations of:

responsive to a subject Bluetooth device receiving one or more remote Bluetooth devices' responses to universally addressed inquiry signals previously issued by the subject Bluetooth device, the subject Bluetooth device measuring prescribed signal quality characteristics of such inquiry responses;

the subject Bluetooth device receiving identification of one or more remote Bluetooth devices to be paged;

for each identified remote Bluetooth device, the subject Bluetooth device performing operations comprising:

applying the mapping to conditions including at least the measured signal quality characteristics of one or more inquiry responses received from the identified remote Bluetooth device to determine a corresponding level of paging transmit power;

paging the identified device using the determined level of paging transmit power.

12. A signal-bearing medium tangibly embodying a program of machine-readable instructions executable by a digital processing apparatus to perform operations for optimizing transmit power levels for Bluetooth paging signals by applying rules dictating different power levels for Bluetooth paging under various specified conditions including signal quality characteristics, the operations comprising:

responsive to a subject Bluetooth device receiving one or more remote Bluetooth devices' inquiry responses to universally addressed inquiry signals previously broadcast by the subject Bluetooth device, the subject Bluetooth device measuring prescribed signal quality characteristics of such inquiry responses;

the subject Bluetooth device receiving identification of one or more remote Bluetooth devices to be paged, and for each identified device, the subject Bluetooth device selecting a transmit power level for use in paging the identified device by performing operations comprising applying the rules to conditions including at least the measured signal quality characteristics of one or more inquiry responses received from the identified device.

13. The medium of claim 12, the operations further comprising:
  establishing the rules.

14. The medium of claim 12, the operations further comprising:
  operating the subject Bluetooth device to broadcast the universally addressed inquiry signals.

15. The medium of claim 12, the operations further comprising:
  for each identified device, the subject Bluetooth device paging the identified device using the selected transmit power level.

16. The medium of claim 12, the operations further comprising:
  for each identified device, the subject Bluetooth device paging the identified device using the selected transmit power level;
  responsive to receiving a response from an identified device, the subject Bluetooth device establishing a connection with the responding device utilizing the selected transmit power level.

17. The medium of claim 12, the operations further comprising, for each identified device:
  the subject Bluetooth device paging said identified device using the selected transmit power level;
  repeatedly paging the identified device with increasing transmit power levels responsive to failures of the subject Bluetooth device to receive signals from the identified device confirming receipt of the pages.

18. The medium of claim 12, where the operation of measuring prescribed signal quality characteristics comprises quantifying at least one of the following:
  strength of received signals;
  packet header failure;
  packet header correction value.

19. The medium of claim 12, the operation of applying the rules comprises:
  applying the rules to conditions including at least a combined representation of previously measured signal quality characteristics of inquiry responses received from the identified device.

20. The medium of claim 12,
  the operations further comprising:
    responsive to receipt of a current inquiry response from a remote Bluetooth device for which a link metric record does not contain any measurements of signal quality characteristics of previous inquiry responses, storing the measurement of signal quality characteristics for the current inquiry response in the link metric record;
    responsive to receipt of a current inquiry response from a remote Bluetooth device for which the link metric record already contains at least one existing measurement of signal quality characteristics of previous inquiry responses, updating the existing measurement to incorporate the measurement of signal quality characteristics for the current inquiry response;
  where the operation of applying the rules comprises applying the rules to the measured signal quality characteristics contained in the link metric record.

21. A signal-bearing medium tangibly embodying a program of machine-readable instructions executable by a digital processing apparatus to perform operations for optimizing power levels used to transmit Bluetooth paging signals, the operations comprising:
  establishing mapping rules associating different Bluetooth transmit power levels with various specified conditions including signal quality characteristics;
  operating a subject Bluetooth device to transmit at least one inquiry signal universally addressed to other Bluetooth devices;
  the subject Bluetooth device receiving one or more inquiry responses to the inquiry signal and measuring signal quality characteristics of the responses;
  the subject Bluetooth device receiving identification of one or more Bluetooth devices to be paged;
  for each identified device, the subject Bluetooth device selecting a power level for use in paging the identified device by performing operations comprising applying the mapping rules to conditions including at least the measured signal quality characteristics of one or more inquiry responses received from the identified device.

22. A signal-bearing medium tangibly embodying a program of machine-readable instructions executable by a digital processing apparatus to perform operations for optimizing transmit power levels for Bluetooth paging signals by applying a mapping supplying different power levels for Bluetooth paging under various corresponding conditions including signal quality characteristics, the operations comprising:
  responsive to a subject Bluetooth device receiving one or more remote Bluetooth devices' responses to universally addressed inquiry signals previously issued by the subject Bluetooth device, the subject Bluetooth device measuring prescribed signal quality characteristics of such inquiry responses;
  the subject Bluetooth device receiving identification of one or more remote Bluetooth devices to be paged;
  for each identified remote Bluetooth device, the subject Bluetooth device performing operations comprising:
    applying the mapping to conditions including at least the measured signal quality characteristics of one or more inquiry responses received from the identified remote Bluetooth device to determine a corresponding level of paging transmit power;
    paging the identified device using the determined level of paging transmit power.

23. Logic circuitry of multiple interconnected electrically conductive elements configured to perform operations to perform operations for optimizing transmit power levels for Bluetooth paging signals by applying rules dictating different power levels for Bluetooth paging under various specified conditions including signal quality characteristics, the operations comprising:
  responsive to a subject Bluetooth device receiving one or more remote Bluetooth devices' inquiry responses to universally addressed inquiry signals previously broadcast by the subject Bluetooth device, the subject Bluetooth device measuring prescribed signal quality characteristics of such inquiry responses;
  the subject Bluetooth device receiving identification of one or more remote Bluetooth devices to be paged, and for each identified device, the subject Bluetooth device selecting a transmit power level for use in paging the identified device by performing operations comprising applying the rules to conditions including at least the measured signal quality characteristics of one or more inquiry responses received from the identified device.

24. The circuitry of claim 23, the operations further comprising:
  establishing the rules.

25. The circuitry of claim 23, the operations further comprising:
   operating the subject Bluetooth device to broadcast the universally addressed inquiry signals.

26. The circuitry of claim 23, the operations further comprising:
   for each identified device, the subject Bluetooth device paging the identified device using the selected transmit power level.

27. The circuitry of claim 23, the operations further comprising:
   for each identified device, the subject Bluetooth device paging the identified device using the selected transmit power level;
   responsive to receiving a response from an identified device, the subject Bluetooth device establishing a connection with the responding device utilizing the selected transmit power level.

28. The circuitry of claim 23, the operations further comprising, for each identified device:
   the subject Bluetooth device paging said identified device using the selected transmit power level;
   repeatedly paging the identified device with increasing transmit power levels responsive to failures of the subject Bluetooth device to receive signals from the identified device confirming receipt of the pages.

29. The circuitry of claim 23, where the operation of measuring prescribed signal quality characteristics comprises quantifying at least one of the following:
   strength of received signals;
   packet header failure;
   packet header correction value.

30. The circuitry of claim 23, the operation of applying the rules comprises:
   applying the rules to conditions including at least a combined representation of previously measured signal quality characteristics of inquiry responses received from the identified device.

31. The circuitry of claim 23,
   the operations further comprising:
      responsive to receipt of a current inquiry response from a remote Bluetooth device for which a link metric record does not contain any measurements of signal quality characteristics of previous inquiry responses, storing the measurement of signal quality characteristics for the current inquiry response in the link metric record;
      responsive to receipt of a current inquiry response from a remote Bluetooth device for which the link metric record already contains at least one existing measurement of signal quality characteristics of previous inquiry responses, updating the existing measurement to incorporate the measurement of signal quality characteristics for the current inquiry response;
   where the operation of applying the rules comprises applying the rules to the measured signal quality characteristics contained in the link metric record.

32. Logic circuitry of multiple interconnected electrically conductive elements configured to perform operations for optimizing power levels used to transmit Bluetooth paging signals, the operations comprising:
   establishing mapping rules associating different Bluetooth transmit power levels with various specified conditions including signal quality characteristics;
   operating a subject Bluetooth device to transmit at least one inquiry signal universally addressed to other Bluetooth devices;
   responsive to the subject Bluetooth device receiving one or more inquiry responses to the inquiry signal and measuring signal quality characteristics of the inquiry responses;
   the subject Bluetooth device receiving identification of one or more Bluetooth devices to be paged;
   for each identified device, the subject Bluetooth device selecting a power level for use in paging the identified device by performing operations comprising applying the mapping rules to conditions including at least the measured signal quality characteristics of one or more inquiry responses received from the identified device.

33. Logic circuitry of multiple interconnected electrically conductive elements configured to perform operations for optimizing transmit power levels for Bluetooth paging signals by applying a mapping supplying different power levels for Bluetooth paging under various corresponding conditions including signal quality characteristics, the operations comprising:
   responsive to a subject Bluetooth device receiving one or more remote Bluetooth devices' responses to universally addressed inquiry signals previously issued by the subject Bluetooth device, the subject Bluetooth device measuring prescribed signal quality characteristics of such inquiry responses;
   the subject Bluetooth device receiving identification of one or more remote Bluetooth devices to be paged;
   for each identified remote Bluetooth device, the subject Bluetooth device performing operations comprising:
      applying the mapping to conditions including at least the measured signal quality characteristics of one or more inquiry responses received from the identified remote Bluetooth device to determine a corresponding level of paging transmit power;
      paging the identified device using the determined level of paging transmit power.

34. A Bluetooth apparatus, comprising:
   at least one transmitter;
   at least one receiver;
   a paging transmit power selector map providing rules dictating different power levels for Bluetooth paging under various specified conditions including signal quality characteristics;
   a link evaluator responsive to the receiver receiving one or more remote Bluetooth devices' inquiry responses to universally addressed inquiry signals previously broadcast by the transmitter to measure prescribed signal quality characteristics of such inquiry responses;
   a processor configured to perform operations optimizing transmit power levels for Bluetooth paging signals, the operations comprising:
      receiving identification of one or more remote Bluetooth devices to be paged;
      for each identified device, selecting a transmit power level for use in paging the identified device by performing operations comprising applying the paging transmit power selector map to conditions including at least the measured signal quality characteristics of one or more inquiry responses received from the identified device.

35. A Bluetooth apparatus, comprising:
   first means for transmitting Bluetooth signals;
   second means for receiving Bluetooth signals;
   paging transmit power selector means for dictating different power levels for Bluetooth paging under various specified conditions including signal quality characteristics;

link evaluator means for, responsive to the second means receiving one or more remote Bluetooth devices' inquiry responses to universally addressed inquiry signals previously broadcast by the first means, measuring prescribed signal quality characteristics of such inquiry responses;

data processing means for optimizing transmit power levels for Bluetooth paging signals by:
  receiving identification of one or more remote Bluetooth devices to be paged;
  for each identified device, selecting a transmit power level for use in paging the identified device by performing operations comprising applying the paging transmit power selector means to conditions including at least the measured signal quality characteristics of one or more inquiry responses received from the identified device.

* * * * *